United States Patent Office 2,930,765
Patented Mar. 29, 1960

2,930,765

PRODUCTION OF A SUPPORTED CATALYST

Leslie Ernest Cooper and Geoffrey Gower, Hull, England, assignors to The Distillers Company Limited, Edinburgh, Scotland, a company of Great Britain No Drawing. Application February 18, 1957
Serial No. 640,577

Claims priority, application Great Britain March 2, 1956

6 Claims. (Cl. 252—473)

The present invention relates to the production of supported catalysts and in particular to the production of catalysts suitable for the selective hydrogenation of unsaturated aldehydes.

The catalytic hydrogenation of unsaturated aldehydes, such as crotonaldehyde, to the corresponding saturated aldehydes carried out in a selective manner such that good yields of the desired compound are obtained is well known. Particularly suitable catalysts for this reaction are the platinum group metals deposited on a solid supporting material such as magnesia and pumice. It has already been proposed to prepare a catalyst of this type by hydrolysing a compound of a platinum group metal in an aqueous solution in the presence of the supporting material to deposit the oxide of the platinum group metal on the supporting material and then reducing the deposited oxide to the catalytically active metal.

Using these known methods of preparation, it has been found that the deposition of the platinum group metal on the supporting material is not completely efficient, only about 60 to 70% of the metal present in the solution being deposited. The remainder of the metal is usually lost as a fine precipitate in the aqueous solution or during the course of washing the prepared catalyst. Such losses of a catalyst constituent are undesirable especially when an expensive material such as platinum group metal is lost. An improved method of preparing the catalyst is therefore required.

It is an object of the present invention to provide an improved method of preparing a catalyst of this type.

According to the present invention, the process for the production of a supported catalyst comprises treating solid mildly alkaline supporting material with a solution of a compound of a platinum group metal in an organic solvent thereby depositing the oxide of the platinum group metal on the supporting material, and reducing the oxide of the platinum group metal to the corresponding metal.

The term "oxide" as used herein in connection with platinum group metals includes not only the oxides as such but also hydroxides and mixtures containing the oxides and hydroxides. In certain cases, in which the deposition medium is of an easily oxidisable nature, the element may be deposited as the metal. By the term "platinum group metal" is meant an element from the group consisting of ruthenium, rhodium, palladium, osmium, iridium and platinum. The compounds of these metals which are used in the process of the invention are such that they can be hydrolysed during the process and that either they or other compounds of the same metal to which they can be converted are soluble in the organic solvents used.

It is an essential feature of the invention that the supporting material used is mildly alkaline. By the expression "mildly alkaline supporting material" is meant supporting material which is either a substantially water-insoluble oxide, hydroxide, basic oxide, carbonate or basic carbonate of a metallic element, examples of such a material being alumina, magnesia, titania and chromia, or is a more neutral and more inert material, such as charcoal, silica gel and pumice, which is pretreated with an aqueous alkaline reagent and then dried, in either case the alkalinity being such that substantially none of the alkali present is transferred from the supporting material to the organic solvent used as the medium for the deposition of the oxide of the platinum group metal. The mild alkalinity may thus either be an intrinsic property of the supporting material, an example of this kind of material being magnesia, or it may be imparted to a more neutral and more inert material, such as charcoal by pre-treating it with an aqueous alkaline reagent. Magnesia and other naturally mildly alkaline materials used as supports can also be pre-treated if desired in this way. The aqueous alkaline reagent used is preferably an aqueous solution of the hydroxide, carbonate or bicarbonate of an alkali metal such as sodium or potassium. The pre-treatment may be carried out by steeping the material in the alkaline reagent preferably at an elevated temperature. The supporting material so treated is then dried before being used in the process of the invention. Of the materials exemplified above, magnesia and pumice are particularly suitable for use in the process of the present invention.

The deposition of the oxide of the platinum group metal on the supporting material is carried out in a medium consisting of an organic solvent which is largely free of water. In these circumstances the solubilities of the mildly alkaline supporting material and of the mildly alkaline reagent with which the supporting material may have been pre-treated are so small that substantially none of the alkali present in the supporting material is transferred to the liquid phase. Furthermore, many compounds of the platinum group metals which are suitable for use in the process are easily soluble in organic solvents. Therefore, in the deposition process, the compound of the platinum group metal is able to migrate to the alkaline surface of the supporting material but the alkali in the supporting material is substantially unable to migrate to the liquid phase. Undesirable precipitation of oxide away from the supporting material is thus avoided and the deposition on the supporting material is achieved in an efficient manner. A firmly adhering coating of deposited oxide of the platinum group metal on the supporting material is obtained.

The deposition is carried out preferably at an elevated temperature and can often be accomplished satisfactorily at the boiling point of the organic solvent used under reflux. However, the optimum working temperature depends to some extent on the proportion of water present in the oraginc phase in which the process takes place. If the water content of the organic phase is small, the rate of deposition may be slow; in this case the process can be operated at a faster rate by working at a more elevated temperature. The presence of a larger water content brings about a faster rate of deposition even when the process is operated at a comparatively low temperature, but at the same time it promotes undesired precipitation in the liquid phase away from the supporting material. The water content of the solvent is accordingly arranged to lie within convenient working limits using a convenient working temperature and is preferably arranged to be between 1 and 10–15% by volume.

The organic solvents which may be used in the invention either singly or in mixtures of two or more, include lower primary and secondary monohydric alcohols, such as methanol, ethanol, n-propanol, isopropyl alcohol, n-butanol, secondary butyl alcohol and isobutyl alcohol; lower ketones such as acetone, ethyl methyl ketone and diethyl ketone; lower esters such as methyl formate, methyl acetate, ethyl formate and ethyl acetate; glycol ethers such as 2-ethoxyethanol and 2-butoxyethanol; water-soluble ethers such as dioxan and dihydropyran; certain of the more water-soluble acetals; and glycols of comparatively high molecular weight, such as hexylene glycol and 2-ethylhexan-1:3-diol, wherein the higher molecular weight tends to offset the hydrophilic character of the glycol group. Glycols of comparatively low molecular weight, such as ethylene glycol, and also glycerol, when used in the process of the invention give rise to excessive precipitation in the liquid phase, presumably because the alkali present in the supporting material is sufficiently soluble in these highly hydrophilic solvents to permit the migration of alkali to the liquid phase. Of the solvents listed above, acetone, ethyl methyl ketone and di-ethyl ketone are particularly useful in the process of the invention.

The amount of water which may be present in any of these organic solvents in order that a convenient rate of deposition is obtained at a convenient working temperature, while preferably lying between the limits given previously, depends on the nature of the particular solvent and on the particular platinum group metal used. Thus methanol with 10% of water proved serviceable but the same solvent with only 1% of water present was unsuitable. Ethanol with 1% of water, on the other hand, proved to be a good medium for the deposition process. n-Propanol and isopropyl alcohol are satisfactory solvents with about 10% of water present, but if only 1% of water is present certain compounds of the platinum group metals such as palladous chloride are insufficiently soluble. Similarly n-butanol, secondary butyl alcohol and isobutyl alcohol can be used with 5-10% water present, but if only 1% water is present the solubility of compounds such as palladous chloride is insufficient to allow this solvent mixture to be useful.

An example of a platinum group metal which can be used in the preparation of hydrogenation catalyst according to the process of the invention is palladium. This metal is preferably supplied to the deposition reaction as palladous chloride or sodium chloropalladite. Palladous chloride is readily soluble in aqueous sodium chloride solution to give a solution of sodium chloropalladite; addition of an organic solvent, such as acetone, to this solution results in the formation of a solution of palladous chloride and, if there is only a limited amount of water present, to the subsequent precipitation of much of the sodium chloride, as indicated in the equation:

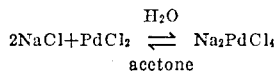

Sodium chloropalladite may be dissolved in the minimum of water and addition of acetone results in precipitation of sodium chloride as shown in the above equation.

When the deposition process has been completed, the suporting material coated with the oxide of the platinum group metal is separated from the organic solvent phase and may then be washed with water and dried. The washing procedure can be carried out so that a large proportion of the chloride present is removed. The coated supporting material thus obtained containing only a small proportion of chloride has been found, when the deposited oxide has been reduced, to afford a catalyst which is particularly useful in the hydrogenation reactions for which the catalysts prepared according to the present invention are intended, good yields of the desired hydrogenated product being obtained. Reduction of the deposited oxide to give the catalytically active metal can be carried out by a process separate from the hydrogenation reaction in which the catalyst is to be used; alternatively, the coated supporting material can be charged to the reactor in which it is intended to carry out the hydrogenation and the reduction of the deposited oxide to the catalytically active metal can be effected, for example, by passing hydrogen into the reactor, so that the reduction is carried out immediately prior to the beginning of the hydrogenation.

Catalysts prepared according to the process described may be arranged to be in the form of a powder or in tablet or in granular form.

The proportion of the active platinum group metal present in the prepared supported catalyst can be determined by the proportions of the supporting material and of the compound of the metal used in the process; these proportions which are used can be varied according to the purpose for which the catalyst is intended. Catalysts suitable for use in the hydrogenation of unsaturated aldehydes can be prepared in the manner described which contain active platinum group metal in the range of 0.01 to 5.0% by weight based on the total weight of supported catalyst.

The catalysts may be used in various kinds of reactions in which ethylenically unsaturated organic compounds are hydrogenated. They are, however, particularly suited for use in the hydrogenation of an ethylenically unsaturated aldehyde, such as crotonaldehyde, to the corresponding saturated aldehyde containing the same number of carbon atoms in the molecule, in such a manner that only a small proportion of by-products is formed, thus enabling good yields of the desired saturated aldehyde to be obtained.

The following example illustrates a method by which the process of the invention may be carried out. Parts by weight shown therein bear the same relation to parts by volume as do kilograms to litres. The percentages given are by weight.

*Example*

1000 parts by volume of magnesia of ¼"–⅛" mesh obtained by calcining magnesite is added to 1000 parts by volume of a 5% aqueous sodium carbonate solution. The mixture is maintained at 100° C. for 10 minutes after which time the supporting material is removed and dried; the material which passes through a sieve of ⅛" mesh is rejected.

3.34 parts by weight of palladous chloride and 2.24 parts by weight of sodium chloride are dissolved in 7.98 parts by weight water and the solution is diluted with 200 parts by volume of acetone. The sodium chloride, which is thereby precipitated, is removed by filtration and the solution is further diluted to 400 parts by volume with acetone.

To the pre-treated supporting material is then added 400 parts by volume of the palladous chloride solution as prepared above, 200 parts by volume of acetone and 30 parts by volume of water. The mixture is gently refluxed for a period of 4 hours. Deposition of palladium oxide takes place on the supporting material. When this deposition is completed there is a colour change of the liquid phase from red-brown to colourless. The liquid phase is then drawn off and the coated supporting material is washed with water at the rate of 25 parts by volume of water per part by volume of catalyst for a period of 4 hours.

The deposition of the palladium on the prepared magnesia is at least 95% efficient.

The coated supporting material is then charged to a reactor in which the hydrogenation reaction is to take place. The palladium oxide is reduced by passing a stream of nitrogen through the reactor at the temperature to be used in the hydrogenation and then gradually introducing hydrogen. The rate of flow of gas is arranged to be 200 parts by volume per volume of catalyst per hour and in each of the first five successive half-hourly periods from the beginning of the introduction of hydrogen, the gas stream contains 5, 10, 20, 50 and 100% by volume of hydrogen.

By this process, an active palladium catalyst is prepared which contains about 0.2% w./v. palladium based on the total volume of the supported catalyst.

Wet crotonaldehyde (94%) was fed as a vapour at the rate of 125 parts by volume per hour with hydrogen at 70,000 parts by volume per hour to a reactor containing 350 parts by volume of the prepared catalyst. The reactor was heated by an oil jacket and maintained at 140° C.

During a run of 500 hours the conversion figure was greater than 99%. The average yield of n-butyraldehyde was 93.5% while the yield of gaseous by-products was 3.5%.

We claim:

1. A process of producing a supported catalyst which comprises steeping a supporting material selected from the group consisting of alumina, magnesia, titania, chromia, charcoal, silica gel and pumice in an aqueous solution of an alkali selected from the group consisting of hydroxides, carbonates and bicarbonates of alkali metals, recovering and then drying the steeped supporting material and heating the dried supporting material with a solution of a compound of a platinum group metal in an organic solvent selected from the group consisting of acetone, ethyl methyl ketone and diethyl ketone, thereby depositing an oxide of the platinum group metal on the supporting material, and thereafter reducing the oxide of the platinum group metal to the corresponding metal.

2. A process of producing a supported catalyst which comprises steeping a supporting material selected from the group consisting of alumina, magnesia, titania, chromia, charcoal, silica gel and pumice in an aqueous solution of an alkali selected from the group consisting of hydroxides, carbonates and bicarbonates of alkali metals, recovering and then drying the steeped supporting material and heating the dried supporting material at a temperature below 250° C. with a solution of a palladium compound in an organic solvent selected from the group consisting of acetone, ethyl methyl ketone and diethyl ketone, thereby depositing an oxide of palladium on the supporting material and thereafter reducing the oxide of palladium to palladium.

3. A process of producing a supported catalyst which comprises steeping magnesia in an aqueous solution of an alkali selected from the group consisting of hydroxides, carbonates and bicarbonates of alkali metals, recovering and then drying the steeped magnesia and heating the dried magnesia at a temperature below 250° C. with a solution of a palladium compound in an organic solvent selected from the group consisting of acetone, ethyl methyl ketone and diethyl ketone, thereby depositing an oxide of palladium on the magnesia and thereafter reducing the oxide of palladium to palladium.

4. A process of producing a supporting catalyst which comprises steeping magnesia in an aqueous solution of sodium carbonate, recovering and then drying the steeped magnesia and heating the dried magnesia at a temperature below 250° C. with a solution of a palladium compound in an organic solvent selected from the group consisting of acetone, ethyl methyl ketone and diethyl ketone, thereby depositing an oxide of palladium on the magnesia and thereafter reducing the oxide of palladium to palladium.

5. A process of producing a supported catalyst which comprises steeping a supporting material selected from the group consisting of alumina, magnesia, titania, chromia, charcoal, silica gel and pumice in an aqueous solution of an alkali selected from the group consisting of hydroxides, carbonates and bicarbonates of alkali metals, recovering and then drying the steeped supporting material and heating the dried supporting material at a temperature below 250° C. with a solution of palladous chloride and sodium chloride in a mixture of water and an organic solvent selected from the group consisting of acetone, ethyl methyl ketone and diethyl ketone, thereby depositing an oxide of the platinum group metal on the supporting material, and thereafter reducing the oxide of the platinum group metal to the corresponding metal.

6. A process of producing a supporting catalyst which comprises steeping magnesia in an aqueous solution of sodium carbonate, recovering and then drying the steeped magnesia and heating the dried magnesia at a temperature below 250° C. with a solution of a palladium compound in acetone, thereby depositing an oxide of palladium on the magnesia and thereafter reducing the oxide of palladium to palladium.

References Cited in the file of this patent

UNITED STATES PATENTS

| | | |
|---|---|---|
| 1,222,660 | Paal | Apr. 17, 1917 |
| 2,030,283 | De Rewal | Feb. 11, 1936 |
| 2,123,732 | Keitel et al. | July 12, 1938 |
| 2,475,155 | Rosenblatt | July 5, 1949 |
| 2,651,598 | Ciapetta | Sept. 8, 1953 |
| 2,749,359 | Calkins et al. | June 5, 1956 |